Figure 4:
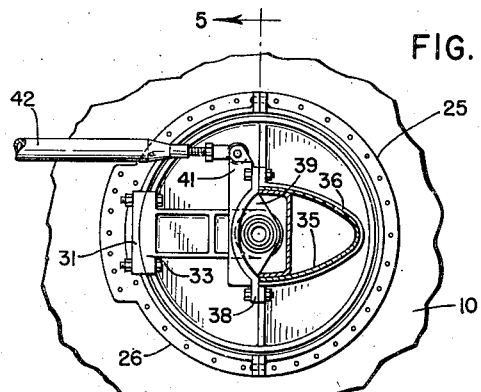

Nov. 11, 1947.　　　W. L. WELLS　　　2,430,793
AIRCRAFT ELEVATOR CONSTRUCTION
Filed July 7, 1944　　　3 Sheets-Sheet 1
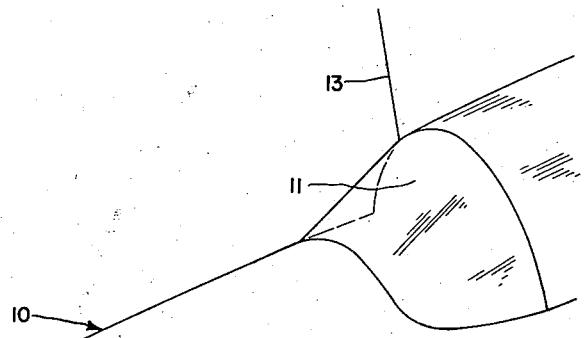
FIG. 1
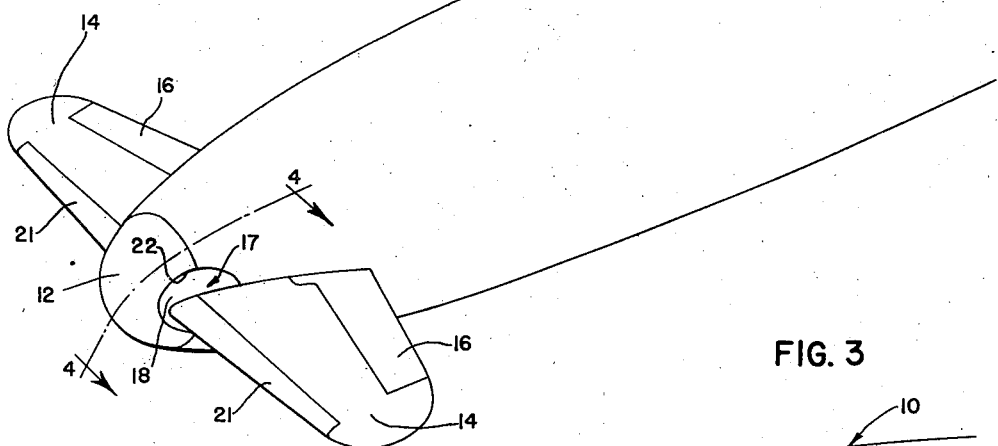
FIG. 2
FIG. 3
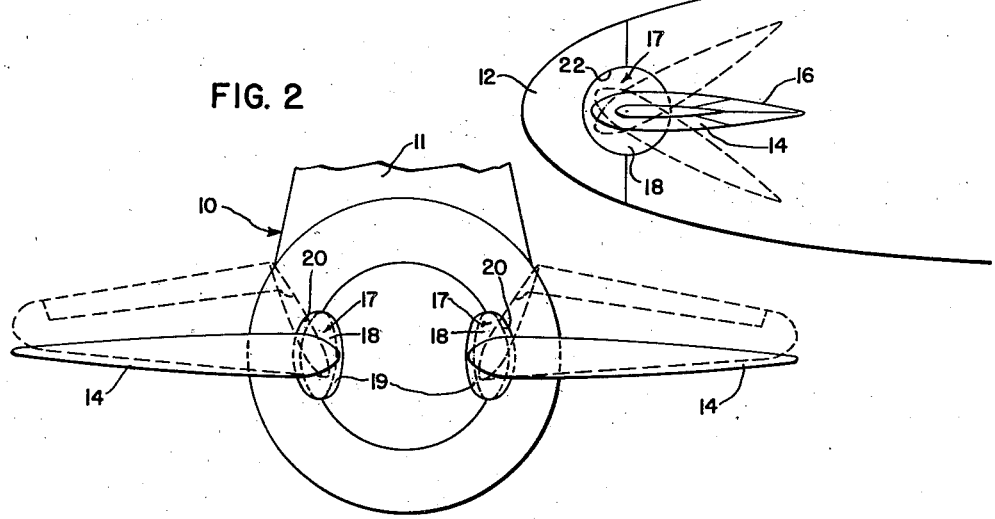
INVENTOR
WILLIS L. WELLS
BY
ATTORNEY Nov. 11, 1947.   W. L. WELLS   2,430,793
AIRCRAFT ELEVATOR CONSTRUCTION
Filed July 7, 1944   3 Sheets-Sheet 2

INVENTOR
WILLIS L. WELLS
BY
ATTORNEY

Nov. 11, 1947.    W. L. WELLS    2,430,793
AIRCRAFT ELEVATOR CONSTRUCTION
Filed July 7, 1944    3 Sheets-Sheet 3

INVENTOR
WILLIS L. WELLS
BY
ATTORNEY

Patented Nov. 11, 1947

2,430,793

UNITED STATES PATENT OFFICE 2,430,793

AIRCRAFT ELEVATOR CONSTRUCTION

Willis L. Wells, Clayton, Mo., assignor to Curtiss-Wright Corporation, a corporation of Delaware Application July 7, 1944, Serial No. 543,895

6 Claims. (Cl. 244—87)

The present invention relates to improvements in aircraft and is directed in particular to certain features of the construction and mounting of a pivoted control surface.

The preferred but not necessarily the only aircraft arrangement to which this invention is applicable is shown and described in detail in a prior application for patent filed by Carl W. Scott and Willis L. Wells on November 6, 1943, and bearing Serial Number 509,318, and some further details thereof have been disclosed in another prior application for patent filed by John Noyes, Jr., and Myron L. Daggett, Jr., on January 19, 1944, and bearing Serial Number 519,072.

In these prior patent applications the aircraft forming the basis for this present invention has been characterized as a tailless or semi-tailless type with certain improvements, and other important features which clearly distinguish it from the so-called "Canard" type of aircraft. Briefly, the airplane comprises a highly streamlined, low drag fuselage having a main supporting surface or wing positioned toward the rear of the fuselage and arranged with its leading edge swept back to a considerable extent such that the wing tends to be longitudinally stable and hence capable of imparting longitudinally stable influences to the airplane as a whole. Furthermore the primary air controls are suitably disposed along the span of the wing at desirable locations, as for example at a distance behind the center of gravity where adequate and effective control may be realized. Improved longitudinal control and stability, in the absence of the more conventional horizontal tail surface, is obtained from a small pivotally mounted elevator surface carried near the leading portion or nose of the fuselage where it is considerably ahead of the main wing thereby giving this surface an advantageous moment arm about the center of gravity of the airplane.

In this arrangement of forward nose elevator and rearwardly spaced swept back wing, it should be pointed out that the elevator is not necessarily intended to develop primary lift or support for the airplane but is principally provided as a means of increasing longitudinal maneuverability and to meet the demands of trim necessary to maintain the airplane in a desirable longitudinal attitude. By preference this elevator means is controlled directly by pilot through a "stick" or other primary control means. However, it is also intended that this elevator be arranged for pivotal displacement and control by means other than the stick and for that purpose tab surfaces have been incorporated with appropriate tab control means available to the pilot. Generally, these tabs may be adjusted to trim or stabilize the airplane in a desired longitudinal attitude. As an example of the function of this nose elevator type control surface, let it be assumed that the airplane has been trimmed longitudinally for level flight by use of the tab means and that the pilot is flying "hands off" or with the elevator in an otherwise unrestrained or free floating condition. In this situation if the airplane encounters an up-gust the nose elevator will immediately trail upwardly thereby creating a diving moment upon the airplane about its center of gravity. This diving moment occurs at a time before the up-gust affects the main wing and thus establishes a control force to counteract the stalling moment developed by the main wing when the latter enters the up-gust. Hence, little or no pitching is experienced by the airplane though the entire airplane may be translated bodily in a vertical direction.

With these basic principles in mind, the features of construction and mounting of the nose elevator service which constitute the subject of this invention will be more readily understood and appreciated. This elevator control surface comprises in its preferred details a pair of cooperating airfoil sections positioned at each side of the forward portion or nose section of the fuselage and extending laterally thereof. Each surface section is of conventional construction except for the novel feature of arranging the primary spar or beam as the airfoil leading edge portion. In assembly, this beam extends over substantially the full leading edge of the elevator and is also carried into the fuselage of the airplane where a beam splice or connection can be effected for the two lateral surfaces. Support of the beam in a manner to provide for pivotal displacement of the elevator about a spanwise axis is effected by a particularly novel structure embodying the combination of pivot forming members together with means for sealing or closing the fuselage to the ingress of air in the normal and displaced positions of the elevator, the fuselage closure being necessitated by the openings therein to receive the inwardly extending beam structure. This means is arranged to maintain a substantially closed condition in the zone of the fuselage surface aperture without necessarily preserving for displaced positions of the control surfaces a flush exterior curvature, since in the present aircraft this portion of the fuselage structure is tapering or conic and thus at no point is the surface in the zone of the closure means normal to the axis of rotation of the elevator.

Accordingly, a primary object of the present invention is to provide an improved air control means for aircraft of the character above noted and one whereby the control means may be pivoted with respect to the fuselage structure upon which it is carried.

It is an object to provide a fuselage surface closure means for association with a pivotally mounted, laterally extending air control means whereby to maintain in a substantially closed condition an aperture formed in a tapering or conic fuselage structure, the aperture being necessary to permit the passage into the interior of the fuselage of suitable supporting members attached to the air control means.

A further object resides in the improved structural arrangement whereby mounting means for the pivotal air control surface or elevator means may be combined with the fuselage closure structure, the better to establish a single axis of rotation and hence provisions for working clearances between the fixed and movable parts of the structure.

Still a further object is to arrange a suitable connecting structure and fuselage aperture closure means for each of the laterally and oppositely extending portions of an air control surface of pivoted type such that aerodynamic disturbances at the zone of juncture therebetween shall be kept at a minimum throughout the normal range of pivotal displacement of the air control surface.

Figure 5:
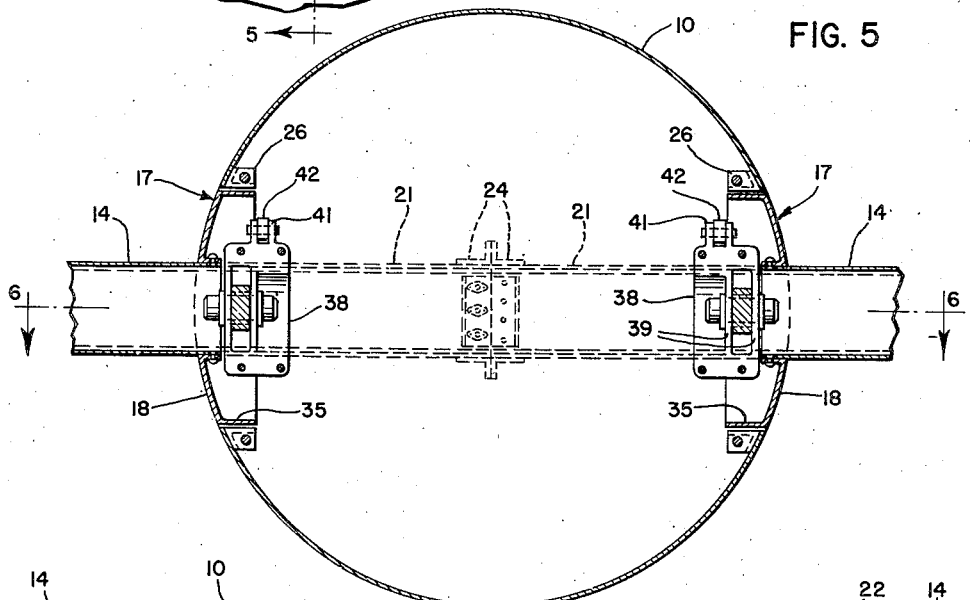
Figure 6:
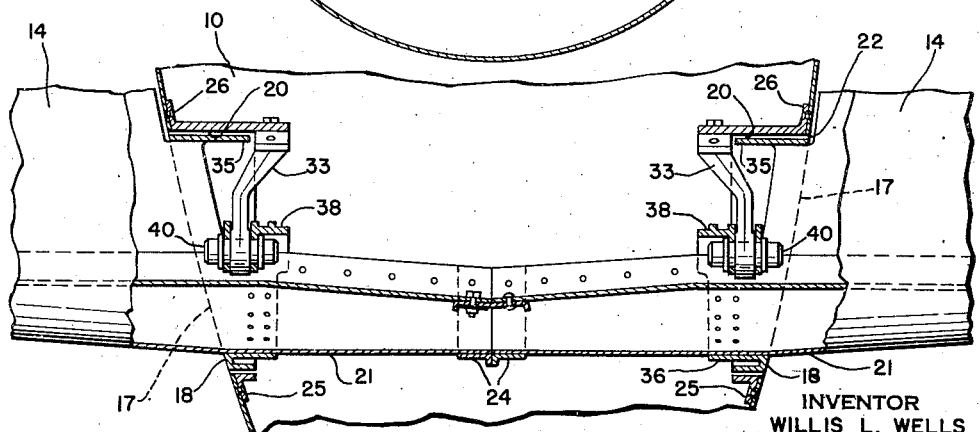
Figure 7:
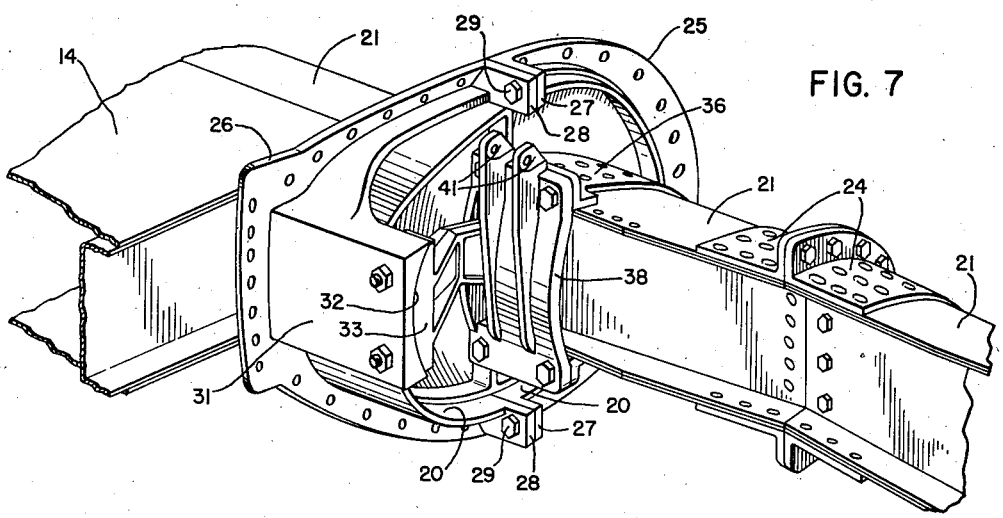
Figure 8:
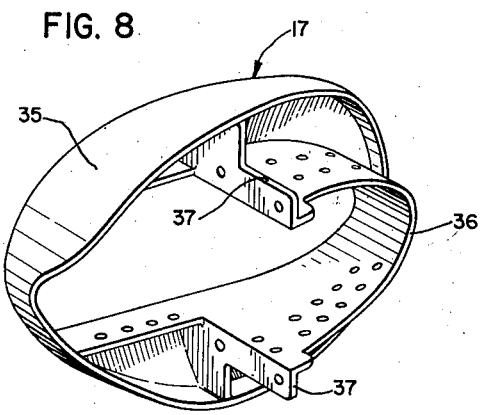
Figure 9:
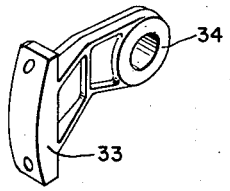

These and other objects and advantages will be appreciated and understood from the following detailed description of a preferred embodiment of the invention as shown in the accompanying drawings, in which:

Fig. 1 is a general perspective view showing the forward portion of an aircraft having the characteristic features noted and on which has been mounted an air control surface of fully pivoted type, Fig. 2 is an enlarged front elevation of the aircraft fuselage illustrating the relation of the closure means and elevator in the neutral and upward positions, the latter position of displacement being indicated by dotted lines, Fig. 3 is a side elevation of the airplane further illustrating the surface closure and also the normal range of elevator pivotal displacement, Fig. 4 is an enlarged, fragmentary interior elevation view of the structure preferred as seen along line 4—4 of Fig. 1, Fig. 5 is a greatly enlarged sectional elevation through the airplane at line 5—5 of Fig. 4, Fig. 6 is a plan view in section of the structure of Fig. 5 as viewed along line 6—6 thereof, Fig. 7 is an interior perspective illustrating in great detail certain portions of the construction and assembly of parts relating to the support and pivotal operation of the elevator means, the view being taken looking generally toward the forward end of the fuselage, Fig. 8 is a detail view of the fuselage closure member carried by and movable with the elevator, and Fig. 9 is a further detail of a typical bearing member upon which the elevator is mounted.

In the ensuing description the several parts and elements which are identical in appearance though distinguished by the fact that some thereof are constructed for right and left hand assembly will be identified by the same numerals of reference. By so doing, the description will be greatly simplified and yet remain easily understandable.

In the drawings, and especially Figs. 1, 2, and 3, there is illustrated generally the forward portion of an airplane fuselage 10 embodying the features and characteristics above noted. It will be observed that the nose structure 10 tapers forwardly from a cockpit or pilot compartment 11 and terminates in a streamlined, conic nose formation 12. The fuselage 10 is supported by a swept back wing, a portion of which is indicated at 13 in Fig. 1. The forward elevator member is positioned near the conic nose 12 and includes laterally extending surfaces 14 which are arranged to pivot about a horizontal axis whereby longitudinal pitching moments may be developed thereby about the center of gravity of the airplane. Each of the elevator elements 14 is provided with a tab or trimming surface 16 thus enabling the pilot of the airplane to deflect the elevator into a position for longitudinal trim or to effect movement of this elevator in controlling the direction of travel of the airplane. In conjunction with the tab control of this elevator, a stick control system may be employed for the same purpose as is more fully described in the prior application for patent of John Noyes, Jr., and Myron L. Daggett, Jr., filed January 19, 1944, and bearing Serial Number 519,072.

An important feature of this invention resides in the means for maintaining an effective closure of the fuselage in the zone of pivotal attachment of the nose elevator. This means has been generally indicated at 17 as a substantially circular member positioned in a suitable fuselage aperture where it is constrained to move or rotate about the axis of rotation of the elevator. It will be observed in Figs. 1, 2 and 6, for example, that this circular closure member 17 is formed with its exterior surface 18 substantially flush with the conic surface of the fuselage nose 12 for the normal neutral position of the elevator, while in positions of deflection or angular displacement of the elevator the forward margins of each closure member 17 move outwardly or project from the fuselage surface as at 19 thus exposing a smooth but curved surface to the air stream. At the same time the rearward portion of the closure will recede or move inwardly a like amount and leave exposed a curved face portion 20 of the interior mounting structure later to be described. However, the normal pivotal travel of the elevator will not cause the closure member 17 to extend at the leading surface or recede at the trailing surface an amount sufficient to create detrimental air turbulence in this zone and as a consequence cause aerodynamic difficulties or great resistance to speed or maneuverability of the airplane.

The elevator surface is constructed about a leading edge forming beam structure 21 of built up section which extends spanwise thereof to support the trailing surface portions 14 and associated tab means 16 the whole surface being mounted for pivotal displacement in a manner to be noted presently. This beam 21 projects inwardly of the fuselage 10, as through an aperture 22, where it is joined by means of flanged attaching members 24 permanently secured to the inboard end of each beam section and bolted or otherwise releasably attached each to the other when arranged in assembly. The leading edge beam members 21, together constituting the primary torque member of the elevator, are mounted for pivotal movement about an axis which passes through the center of the circular apertures 22 in the fuselage in the following manner:

Adjacent the margin of the aperture 22 there is secured, as by suitable flanges, the fixed member 5 of the closure structure which comprises a forward portion 25 and a rearward portion 26, these parts being arranged in assembly for abutment along a diametral parting plane defined by inwardly projecting flanges 27 and 28 respectively, and maintained when assembled in proper alignment by dowel pins 29 fixed in the flanges 28 and having a press-fit in the flanges 27. In this manner access to the interior of the forward space of the fuselage may be had upon removal of the nose cap 12 to which the flanged members 25 are suitably secured. The rearward member 26 and forward member 25 provide in assembly an inwardly extending cylindrical face 29 with its axis of revolution coincident with the pivot axis of the elevator. To establish this coincidence of axes, the member 26 is provided with an enlarged and inwardly extending base 31, the forwardly directed surface of which has been formed to provide an arcuate seat 32 upon which a bearing bracket, 33 is mounted. This bracket extends forwardly and terminates in a bearing boss or housing 34 thereby establishing the principal axis desired. Since there are two such bearing members 33 in lateral spaced relation a stable and rigid mount can be realized.

The means adopted for mounting the elevator in these bearing bosses includes the movable member 17 of each of the fuselage structures. Each member shown as of cast construction and as having a circular, axially directed flanged face 35 varying in depth inwardly from the exterior surface 18 thereof (Fig. 8), is provided with a wide mounting flange 36 of airfoil configuration to wrap around the beam structure 21 as shown in Fig. 7. At the rear, axially directed margins of the mounting flange 36 there are provided other suitable mounting flanges 37 to receive a bracket plate 38 which is bolted or detachably secured in place. This plate 38 constitutes the supporting and pivot forming member for the beam 21, and for that purpose is provided with a pair of spaced bearing members 39 each of which is directed forwardly at either side of the principal bearing means 34 in such a manner that a pin element or stub shaft 40 may be journaled therein to permit rotation of the member 17 about the axis desired. With reference to Figs. 4, 5, and 7 it will be noted that the bracket plate 38 is also provided with upstanding ears 41 for the attachment of a push-pull rod 42, the rod being associated with a suitable pilot's control column (not shown). The preferred arrangement is to utilize a dual push-pull system for effecting displacement control of the elevator and for that reason each of the plates 38 is provided with ears 41 for pivotal attachment of a control rod 42 (Fig. 5).

The flanged portion 35 of closure member 17 cooperates with the concentrically related and adjacent flanged portion 20 of the members 25 and 26 in maintaining a substantially complete and effective closure of the fuselage aperture 22 throughout the normal range of angular displacement of the elevator. For this purpose the flange portion 35 is gradually tapered from a relatively narrow face at the leading portion to a relatively wide face well to the rear thereof so that upon axial extension thereof during angular displacement of the elevator surface to either side of its normal position the progressively exposed portion of flange 35 will be sufficiently wide to maintain its lapped position with respect to the flange face 20 and hence the desired closure of the fuselage aperture 22.

The above description relates to a preferred arrangement of parts and elements adapted to permit pivotal displacement of a horizontally disposed control surface and to effect a substantial closure of the fuselage in the zone of entry of the control surface beam members into the fuselage interior. Of particular importance is the arrangement of utilizing the control surface leading edge structure as the primary beams for its support and also as the means upon which closure elements may be mounted thereby making it possible to establish a common axis about which the moving parts of the system are adapted to rotate or oscillate. However, it should be understood that various changes and modifications may be made or may be suggested after a study hereof without materially departing from the spirit and intended scope of the invention as defined by the claims hereafter appearing.

What is claimed is:

1. In an airplane the supporting wing of which is positioned toward the rear of the fuselage, the combination of a control surface mounted on the fuselage near the forward end thereof to extend laterally on opposite sides thereof and being arranged for pivotal displacement about a spanwise axis in either direction from a neutral control position whereby the airplane is rendered longitudinally controllable, a supporting and torque transmitting member constituting the leading edge of said control surface and passing through the fuselage, means attached to the fuselage for pivotally supporting said member, and other means attached to said member for cooperation with said first means in providing the pivotal support for said control surface.

2. In an airplane the supporting wing of which is positioned toward the rear of the fuselage, the combination of a control surface mounted on the fuselage near the forward end thereof and considerably forwardly of the wing member to extend laterally on opposite sides thereof and being arranged for pivotal displacement about a spanwise axis in either direction from a neutral control position whereby the airplane is rendered longitudinally controllable, a supporting and torque transmitting member constituting the leading edge of said control surface and passing through the fuselage, means attached to the fuselage at points spaced spanwise of said control surface, bearing members carried by said means for pivotally supporting said member, and other means attached to said member and being spaced apart for cooperation with said bearing members in providing the pivotal support for said control surface.

3. In an aircraft construction having a main wing near the aft end of the fuselage and in which the latter is formed with oppositely directed openings near the forward end thereof; the combination therewith of a two part control surface, each part of which is positioned adjacent one of said fuselage openings to extend laterally therefrom, and being further arranged for concurrent pivotal displacement about a spanwise axis in either direction from a neutral control position whereby the aircraft is rendered longitudinally controllable; a torque transmitting element constituting the leading edge of each said control surface part and extending into the fuselage through said openings for connection each with the other to form a common substantially rigid torque member for the control surface parts; separate means fixed to the fuselage and positioned inwardly of each fuselage opening; separate means attached to each torque transmitting element, one thereof being positioned adjacent each said first means; and a pivot element carried between the adjacent ones of said separate means whereby a common axis for the pivotal displacement of said control surface is established.

4. In an aircraft construction, a body structure formed with axially aligned openings near one end thereof, a control surface positioned adjacent each said opening and extending laterally of the fuselage, control surface moving and supporting elements constituting the leading edge thereof and extending into the fuselage through said openings where they are united to form a continuous member interconnecting the laterally extending control surfaces for concurrent actuation, a flanged structure fixed at each said body opening, a cooperating pair of pivot forming means connected between each supporting element and the corresponding flanged structure in a zone adjacent the corresponding fuselage opening through which the supporting element passes, and means carried on each said supporting element for movement therewith and arranged in conjunction with said flanged structures to effect a substantial closure of said fuselage openings throughout the effective range of control surface movement provided by said pivot forming means.

5. An aircraft including a fuselage having a supporting wing positioned toward the rearward end thereof and a fully pivotally mounted control surface disposed near the forward end of the fuselage, said control surface having a beam structure at the leading edge portion thereof, said beam structure extending through fuselage apertures in opposite sides of the aircraft, a first pair of members disposed adjacent one of the fuselage apertures, one of said members being fixed to the fuselage and the other being fixed to said beam structure for closing the aperture about the latter, a second pair of members disposed adjacent the opposite fuselage aperture, one of said latter members being fixed to the fuselage and the other being fixed to said beam structure for closing the aperture about the latter, and means carried by said ones of each pair of members which are fixed to the fuselage for supporting said beam structure for pivotal movement about its spanwise axis.

6. An aircraft including a fuselage having a supporting wing positioned toward the rearward end thereof and a fully pivotally mounted control surface disposed near the forward end of the fuselage, said control surface having a beam structure at the leading edge portion thereof, said beam structure extending through fuselage apertures in opposite sides of the aircraft, a first pair of members disposed adjacent one of the fuselage apertures, one of said members being fixed to the fuselage and the other being fixed to said beam structure for closing the aperture about the latter, a second pair of members disposed adjacent the opposite fuselage aperture, one of said latter members being fixed to the fuselage and the other being fixed to said beam structure for closing the aperture about the latter, each member of said first and second pair of members being formed with an inwardly extending flange which defines a cylindrical surface, the respective cylindrical flanged surfaces of each said pair of members being concentrically cooperative to extend the aperture closure effect inwardly of the fuselage contour, and means carried by said ones of each pair of members which are fixed to the fuselage for supporting said beam structure for pivotal movement about its spanwise axis, the pivot axis for said beam structure being coincident with the center of the cylindrical surfaces of said first and second pair of members.

WILLIS L. WELLS.

REFERENCES CITED

The following references are of record in the file of this patent:

UNITED STATES PATENTS

| Number | Name | Date |
|---|---|---|
| 2,021,470 | Upson | Nov. 19, 1935 |
| 1,746,042 | Kinzel | Feb. 4, 1930 |
| 2,362,224 | Roseland | Nov. 7, 1944 |
| 1,492,518 | Martin | Apr. 29, 1924 |
| 1,392,278 | Kirkham et al. | Sept. 27, 1921 |
| 1,394,460 | Willard | Oct. 18, 1921 |

FOREIGN PATENTS

| Number | Country | Date |
|---|---|---|
| 497,969 | Great Britain | Jan. 2, 1939 |
| 434,325 | France | Nov. 22, 1911 |
| 446,260 | Germany | June 27, 1927 |